(12) United States Patent
Christensen

(10) Patent No.: US 6,786,315 B1
(45) Date of Patent: Sep. 7, 2004

(54) THRUST REVERSER SYSTEM WITH SEQUENTIAL TORQUE DECOUPLER

(75) Inventor: Donald J. Christensen, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/401,458

(22) Filed: Mar. 28, 2003

(51) Int. Cl.⁷ .................................................. F02K 3/02
(52) U.S. Cl. ................. 192/48.7; 192/48.9; 192/55.1; 192/56.1; 60/223; 60/226.2; 239/265.29; 244/100 B; 188/181 T
(58) Field of Search ............................. 192/48.7, 48.8, 192/48.9, 55.1, 56.1; 60/223, 226.2; 239/265.29; 244/110 B; 188/181 T

(56) References Cited

U.S. PATENT DOCUMENTS

| | | |
|---|---|---|
| 1,199,612 A | 9/1916 | Rice |
| 2,015,688 A | 10/1935 | Ney |
| RE22,852 E | 3/1947 | Swift, Jr. |
| 2,441,052 A | 5/1948 | Wilmer |
| 2,660,281 A | 11/1953 | Ochtman |
| 2,819,589 A | 1/1958 | Geyer |
| 3,082,684 A | 3/1963 | Sturla |
| 3,367,456 A | 2/1968 | Bohnhoff |
| 3,596,740 A | 8/1971 | Nau |
| 3,621,763 A * | 11/1971 | Geyer ........................ 92/17 |
| 3,653,226 A | 4/1972 | Westbury |
| 3,831,400 A | 8/1974 | Morin |
| 4,030,578 A | 6/1977 | Cacciola et al. |
| 4,196,799 A | 4/1980 | Taylor et al. |
| 4,273,006 A | 6/1981 | Woodbury |
| 4,273,388 A | 6/1981 | Muller |
| 4,318,304 A | 3/1982 | Lang |
| 4,346,793 A | 8/1982 | Fuse et al. |

(List continued on next page.)

Primary Examiner—Saúl J. Rodriguez
(74) Attorney, Agent, or Firm—Douglas A. Mullen, Esq.

(57) ABSTRACT

An aircraft thrust reverser system that includes a power drive unit operable to supply a drive force. The power drive unit includes a motor and a torque decoupler that sequentially decouples the power drive unit from a plurality of loads. The torque decoupler includes at least two output sections, each of which is coupled to the motor, and are not coupled to one another under normal operating circumstances. The output sections are each operable to decouple the motor from associated thrust reverser moveable components upon a torque magnitude being reached in the output section. The torque decoupler is configured so that the first and second output sections are coupled together a deadband time period after the torque magnitude is reached in on of the output sections.

25 Claims, 5 Drawing Sheets

U.S. PATENT DOCUMENTS

| | | | |
|---|---|---|---|
| 4,391,409 A | * 7/1983 | Scholz | 239/265.09 |
| 4,442,928 A | 4/1984 | Eastman | |
| 4,458,582 A | 7/1984 | Linton | |
| 4,459,121 A | 7/1984 | Gazzera et al. | |
| 4,459,867 A | 7/1984 | Jones | |
| 4,531,617 A | 7/1985 | Martin et al. | |
| 4,543,783 A | 10/1985 | Greiine et al. | |
| 4,545,470 A | 10/1985 | Grimm | |
| 4,556,131 A | 12/1985 | Chapman | |
| 4,579,039 A | * 4/1986 | Ebbing | 91/166 |
| 4,625,843 A | 12/1986 | Maltby et al. | |
| 4,693,349 A | 9/1987 | Tysver | |
| 4,714,006 A | * 12/1987 | Tootle et al. | 92/5 R |
| 4,736,807 A | 4/1988 | Davis | |
| 4,871,296 A | 10/1989 | Laessle et al. | |
| 4,898,265 A | 2/1990 | Metcalf | |
| 4,905,805 A | 3/1990 | Grimm | |
| 4,944,379 A | 7/1990 | Haaser | |
| 5,046,376 A | 9/1991 | Baker | |
| 5,145,041 A | 9/1992 | Hirai | |
| 5,199,538 A | * 4/1993 | Fischer et al. | 192/223.3 |
| 5,280,704 A | 1/1994 | Anderson et al. | |
| 5,359,848 A | 11/1994 | Davies | |
| 5,448,884 A | * 9/1995 | Repp | 60/223 |
| 5,545,109 A | 8/1996 | Hayakawa | |
| 5,609,020 A | 3/1997 | Jackson et al. | |
| 5,630,490 A | 5/1997 | Hudson et al. | |
| 5,655,636 A | 8/1997 | Lang et al. | |
| 5,769,362 A | 6/1998 | Greene et al. | |
| 5,811,139 A | 9/1998 | Hehl | |
| 5,901,817 A | 5/1999 | Gitnes | |
| 5,944,148 A | 8/1999 | Bae et al. | |
| 5,950,774 A | 9/1999 | Lang et al. | |
| 5,957,798 A | 9/1999 | Smith, III et al. | |
| 6,044,943 A | 4/2000 | Bytzek et al. | |
| 6,059,085 A | 5/2000 | Farnsworth | |
| 6,202,803 B1 | 3/2001 | Lang | |
| 6,209,690 B1 | 4/2001 | Kuivamaki et al. | |
| 6,240,797 B1 | 6/2001 | Morishima et al. | |
| 6,332,842 B1 | 12/2001 | Tabuchi et al. | |
| 6,358,152 B2 | 3/2002 | Casutt | |
| 6,401,557 B1 | 6/2002 | Davies | |
| 6,487,846 B1 | 12/2002 | Chakkera et al. | |
| 6,494,033 B1 | 12/2002 | Davies | |
| 6,598,386 B2 | * 7/2003 | Johnson et al. | 60/226.2 |
| 6,666,307 B1 | * 12/2003 | Christensen | 188/134 |
| 2002/0134180 A1 | 9/2002 | Gorin et al. | |
| 2003/0006119 A1 | 1/2003 | Harvey | |

* cited by examiner

THRUST REVERSER SYSTEM WITH SEQUENTIAL TORQUE DECOUPLER

FIELD OF THE INVENTION

The present invention relates to aircraft engine thrust reverser actuation systems and, more particularly, to a decoupler that is used to limit the torque in an aircraft thrust reverser drive train that is driven by a single power drive unit.

BACKGROUND OF THE INVENTION

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. In the stowed position, the thrust reversers do not redirect the jet engine's thrust.

The moveable thrust reverser components in each of the above-described designs are moved between the stowed and deployed positions by actuators. Power to drive the actuators may come from a dual output power drive unit (PDU), which may be electrically, hydraulically, or pneumatically operated, depending on the system design. A drive train that includes one or more drive mechanisms, such as flexible rotating shafts, may interconnect the actuators and the PDU to transmit the PDU's drive force to the moveable thrust reverser components.

Each of the above-described thrust reverser system configurations is robustly designed and is safe and reliable. Nonetheless, analysis has shown that secondary damage to various portions of the thrust reverser system may result under certain postulated circumstances. For example, if one of the actuators coupled to one of the PDU outputs becomes jammed, it is postulated that all of the drive force supplied from the PDU would be concentrated, via the synchronization mechanisms, on the jammed actuator. This postulated condition may result in damage to the actuator system components, including the PDU, actuators, drive mechanisms, or the moveable thrust reversers components. Repairing such damage can be costly and result in aircraft down time. One solution is to use stronger components, but this increases the cost and/or weight of the thrust reverser system. Another solution is to include numerous, independently operated torque limiters or decouplers in each drive train coupled to the PDU outputs. However, this solution may also increase system cost and/or weight.

Accordingly, there is a need for a thrust reverser system that improves upon one or more of the drawbacks identified above. Namely, a system that reduces the likelihood of component damage if the thrust reverser system fails, for example, by a jammed actuator, without significantly increasing the cost and/or the weight of the thrust reverser system components. The present invention addresses one or more of these needs.

SUMMARY OF THE INVENTION

The present invention provides a system and method that sequentially decouples a thrust reverser system power drive unit from two or more loads that are coupled to a single output shaft in the event a torque magnitude is reached between the power drive unit and one of the loads.

In one embodiment, and by way of example only, a thrust reverser control system includes a motor, at least two drive mechanisms, at least two actuators, and a torque decoupler. The motor has an output shaft and is operable to supply a drive force. The drive mechanisms are each coupled to receive the drive force. Each actuator assembly is coupled to at least one of the drive mechanisms and is operable to move, upon receipt of the drive force, between a stowed position and a deployed position. The torque decoupler is coupled between the motor output shaft and two of the drive mechanisms and includes a first output section and a second output section. The first output section is coupled to the motor output shaft and is operable to (i) decouple the motor from one of the drive mechanisms upon a first torque magnitude being reached in the first output section and (ii) engage the second output section a time period after the first torque magnitude is reached. The second output section is coupled to the motor output shaft and is operable to (i) decouple the motor from the other drive mechanism upon a second torque magnitude being reached in the second output section and (ii) engage the first output section a time period after the second torque magnitude is reached.

In another exemplary embodiment, a power drive unit includes a motor, a first output section, and a second output section. The motor has an output shaft and is operable to supply a drive force to at least a first load and a second load. The first and second output section are coupled to the motor output shaft. The first output section is operable to (i)

decouple the motor from the first load upon a first torque magnitude being reached in the first output section and (ii) engage the second output section a time period after the first torque magnitude is reached. The second output section is operable to (i) decouple the motor from the second load upon a second torque magnitude being reached in the second output section and (ii) engage the first output section a time period after the second torque magnitude is reached.

In yet another exemplary embodiment, a torque decoupler assembly operable to decouple at least a first and a second load from a single motor output shaft includes a first output section and a second output section. The first output section is adapted to couple to the motor output shaft and is operable to (i) decouple the motor from the first load upon a first torque magnitude being reached in the first output section and (ii) engage the second output section a time period after the first torque magnitude is reached. The second output section is adapted to couple to the motor output shaft and is operable to (i) decouple the motor from the second load upon a second torque magnitude being reached in the second output section and (ii) engage the first output section a time period after the second torque magnitude is reached.

Other independent features and advantages of the preferred thrust reverser system and torque decoupler will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
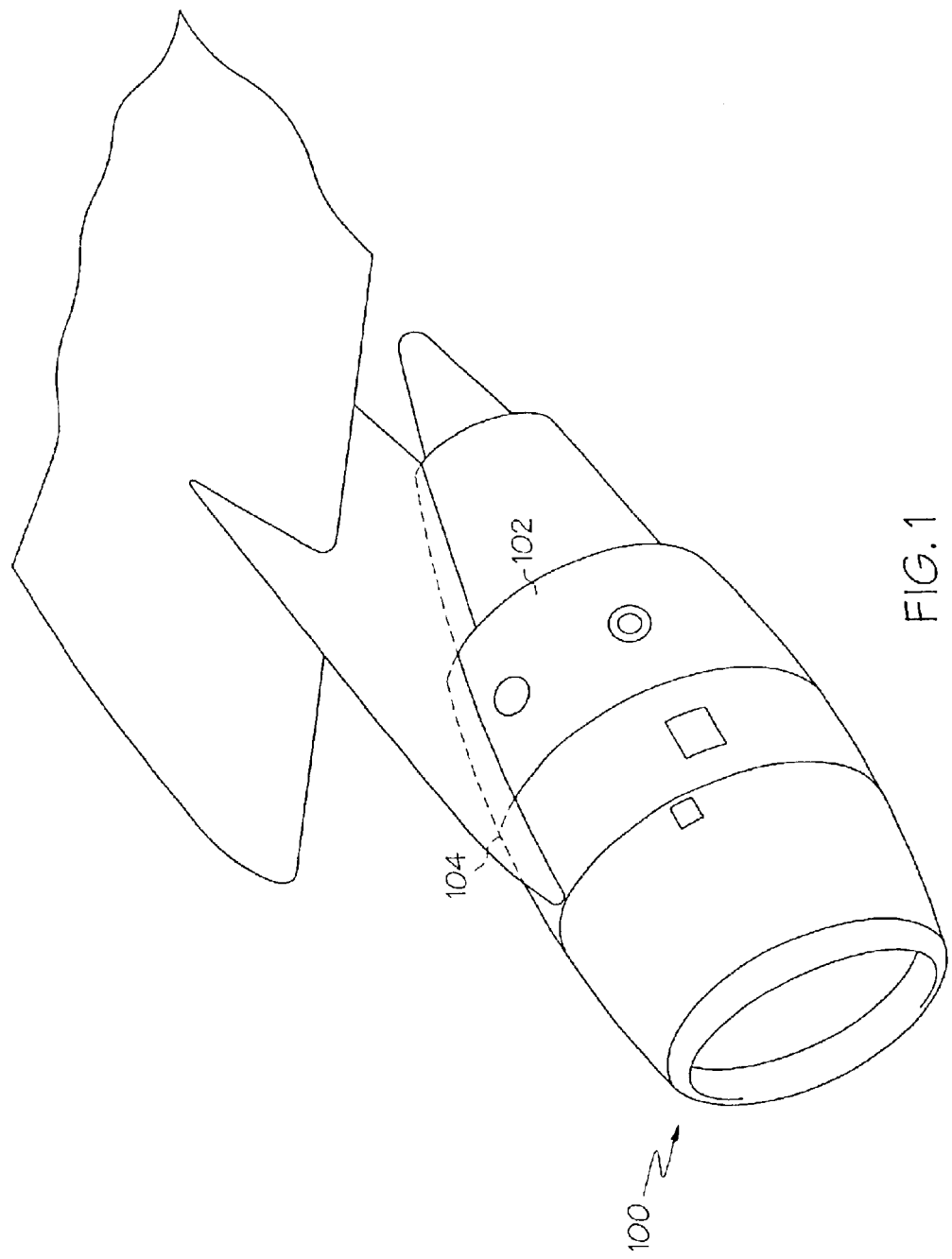
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
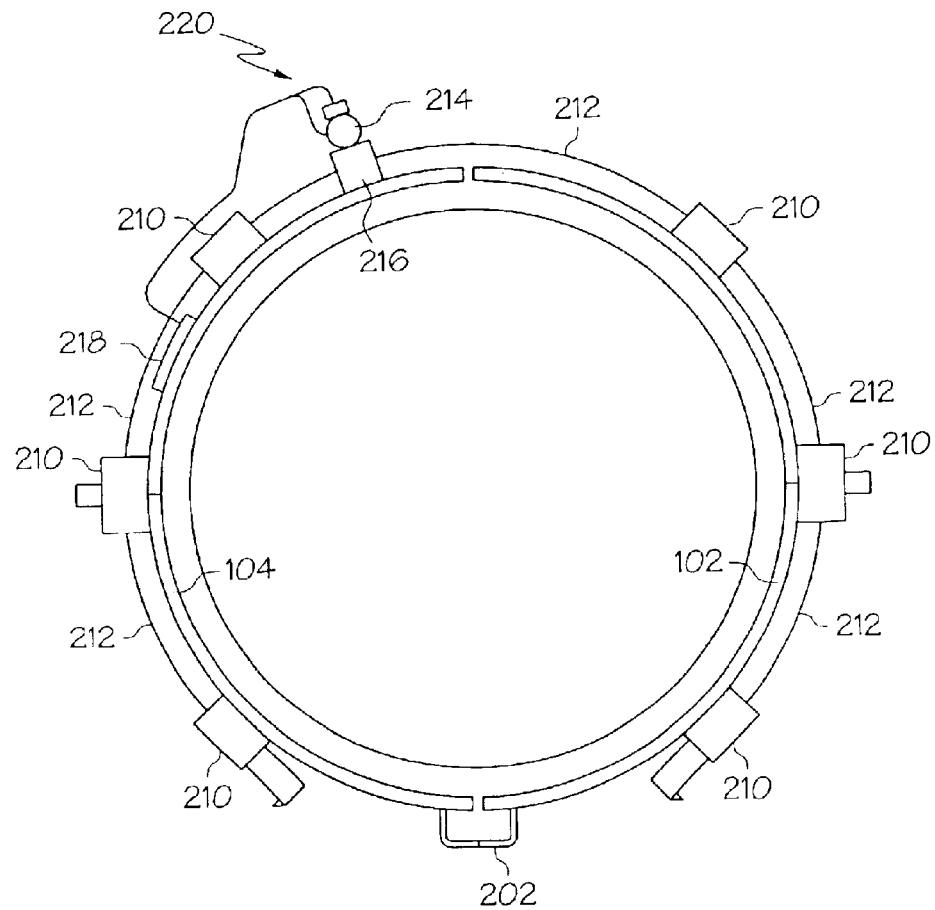
FIG. 2 is a simplified end view of a thrust reverser actuation system according to an exemplary embodiment of the present invention.

As shown more clearly in FIG. 2, a plurality of actuators 210 are individually coupled to the transcowls 102 and 104. In the depicted embodiment, half of the actuators 210 are coupled to one of the transcowls 102, and the other half are coupled to another transcowl 104. While not critical to understand or enable the present invention, it is noted that some or all of the actuators 210 may include locks, some or all of which may include position sensors. In addition, the transcowls 102 and 104 may also, or alternatively, each include locks. It is noted that the actuators 210 may be any one of numerous actuator designs presently known in the art or hereafter designed. However, in this embodiment the actuators 210 are ballscrew actuators. It is additionally noted that the number and arrangement of actuators 210 is not limited to what is depicted in FIG. 2, but could include other numbers of actuators 210 as well. The number and arrangement of actuators is selected to meet the specific design requirements of the system.

The actuators 210 are interconnected via a plurality of drive mechanisms 212, each of which, in the particular depicted embodiment, is a flexible shaft. Using flexible shafts 212 in this configuration ensures that the actuators 210 and the transcowls 102 and 104 move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuators 210.

A power drive unit (PDU) assembly 220, which includes a torque decoupler assembly 216, is coupled to the actuators 210 via one or more flexible shafts 212. In the depicted embodiment, the PDU assembly 220 includes a motor 214 that is coupled to the torque decoupler assembly 216. The motor 214 may be any one of numerous types of motors such as, for example, an electric (including any one of the various DC or AC motor designs known in the art), a hydraulic, or a pneumatic motor. The torque decoupler assembly 216 is coupled between an output of the motor 214 and two of the flexible shafts 212. Moreover, though not explicitly depicted in FIG. 2, the PDU assembly 220 may include a lock mechanism. In any case, with the depicted arrangement, the rotation of the PDU assembly 220 results in the synchronous operation of the actuators 210, via the flexible shafts 212, thereby causing the transcowls 102 and 104 to move at substantially the same rate.

The PDU assembly 220 is controlled by a control circuit 218. The control circuit 218 receives commands from a non-illustrated engine control system such as, for example, a FADEC (full authority digital engine control) system, and provides appropriate activation signals to the PDU assembly 220 in response to the received commands. In turn, the PDU assembly 220 supplies a drive force to the actuators 210 via the flexible shafts 212. As a result, the actuators 210 cause the transcowls 102 and 104 to translate between the stowed and deployed positions.

Turning now to FIGS. 3–7 a description of a particular preferred embodiment of the PDU assembly 220 and its operation will be provided. Beginning with FIG. 3, which depicts a functional schematic representation of the PDU assembly 220, a general description of the PDU assembly 220 and its operation will first be provided. Thereafter, a more detailed description of the depicted PDU assembly embodiment will be provided.

Figure 3:
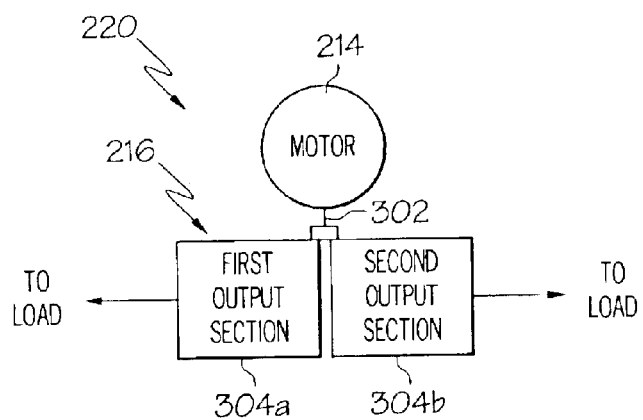
FIG. 3 is a simplified functional schematic diagram of a power drive unit according to an exemplary embodiment of the present invention that may be used in the system of FIG. 2.

As shown in FIG. 3, the PDU assembly 220 includes the motor 214 and the torque decoupler assembly 216. The motor 214 includes an output shaft 302, and the torque decoupler assembly 216 includes two output sections, a first output section 304a and a second output section 304b. Each of the output sections 304a and 304b is coupled to the motor output shaft 302. In addition, each output section 304a and 304b is adapted to couple to a load such as, for example, the above-mentioned drive mechanisms 212 and to one or more actuators 210.

As was noted above, the PDU assembly 220, when installed in a thrust reverser actuation system, supplies a drive force to the actuators 210. While the PDU assembly 220 is supplying the drive force, if the torque in the first (or second) output section 304a (or 304b) exceeds a magnitude due, for example, to a jammed actuator 210, then the first (or second) output section 304a (or 304b) will decouple the motor output shaft 302 from the drive mechanisms 212 and the jammed actuator 210. Thereafter, if the motor 214 continues rotating, the output sections 304a and 304b will rotate at unequal speeds, and relative rotation will exist between the first and second output sections 304a and 304b. After a deadband time period, the first 304a and second 304b output sections are coupled together. When this occurs, the torque in the second (or first) output section 304b (or 304a) will then exceed the torque magnitude, and decouple the motor output shaft 302 from the drive mechanisms 212. As a result, the PDU assembly 220 is fully decoupled from the load.

Sequentially decoupling the motor output shaft 302 from the respective drive mechanisms 212 when the torque magnitude in one of the output sections 304a or 304b reaches the magnitude reduces the likelihood of any additional component damage. If the motor output shaft 302 were decoupled from only one output section 304a or 304b, the motor 214 would continue supplying the drive force to its respective drive mechanism 212. If the thrust reverser transcowl halves 102 and 104 are linked by, for example, the mechanical link 202, the motor 214 would continue to drive, or attempt to drive, the transcowl half 102 or 104 to which it is coupled. This could result in additional damage. In addition, the motor 214 may need to be more robustly designed to withstand higher torque limits, which can increase system size, weight, and/or cost.

Figure 4:
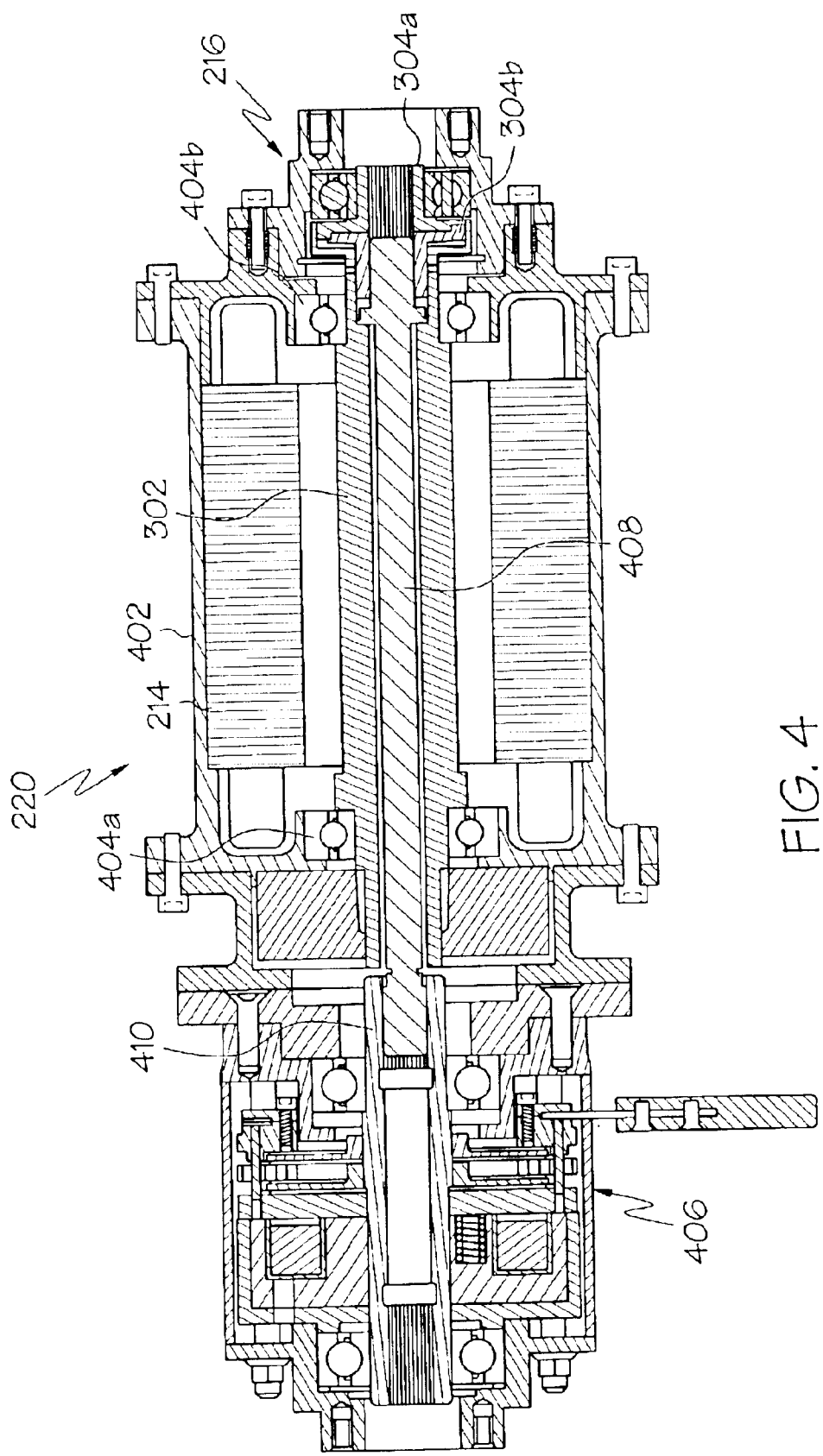
FIG. 4 is a detailed cross section view of an exemplary embodiment of the power drive unit of FIG. 3.
Figure 5:
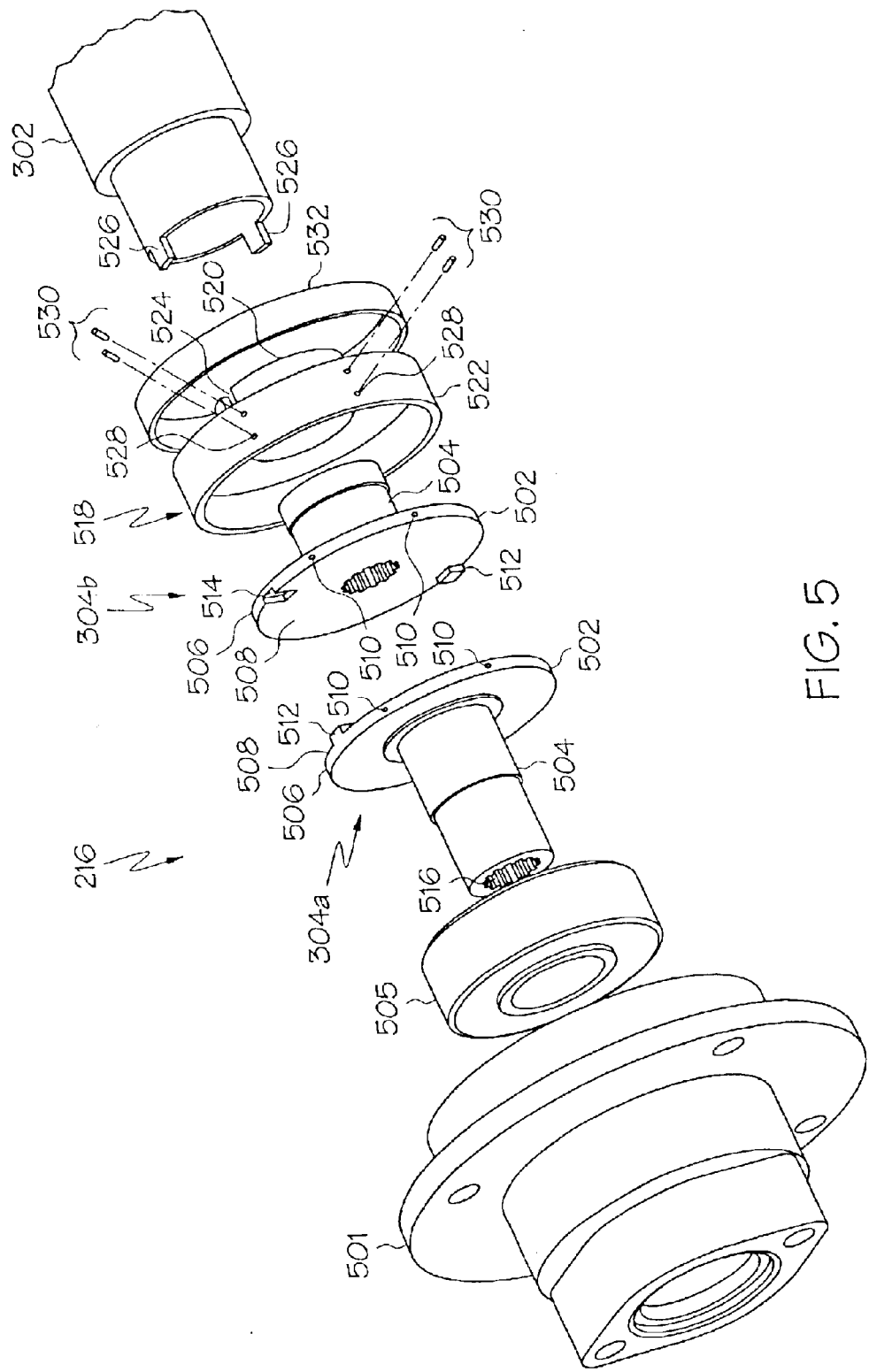
FIG. 5 is an exploded perspective view of an exemplary torque decoupler that may be used with the power drive unit of FIG. 4.
Figure 6:
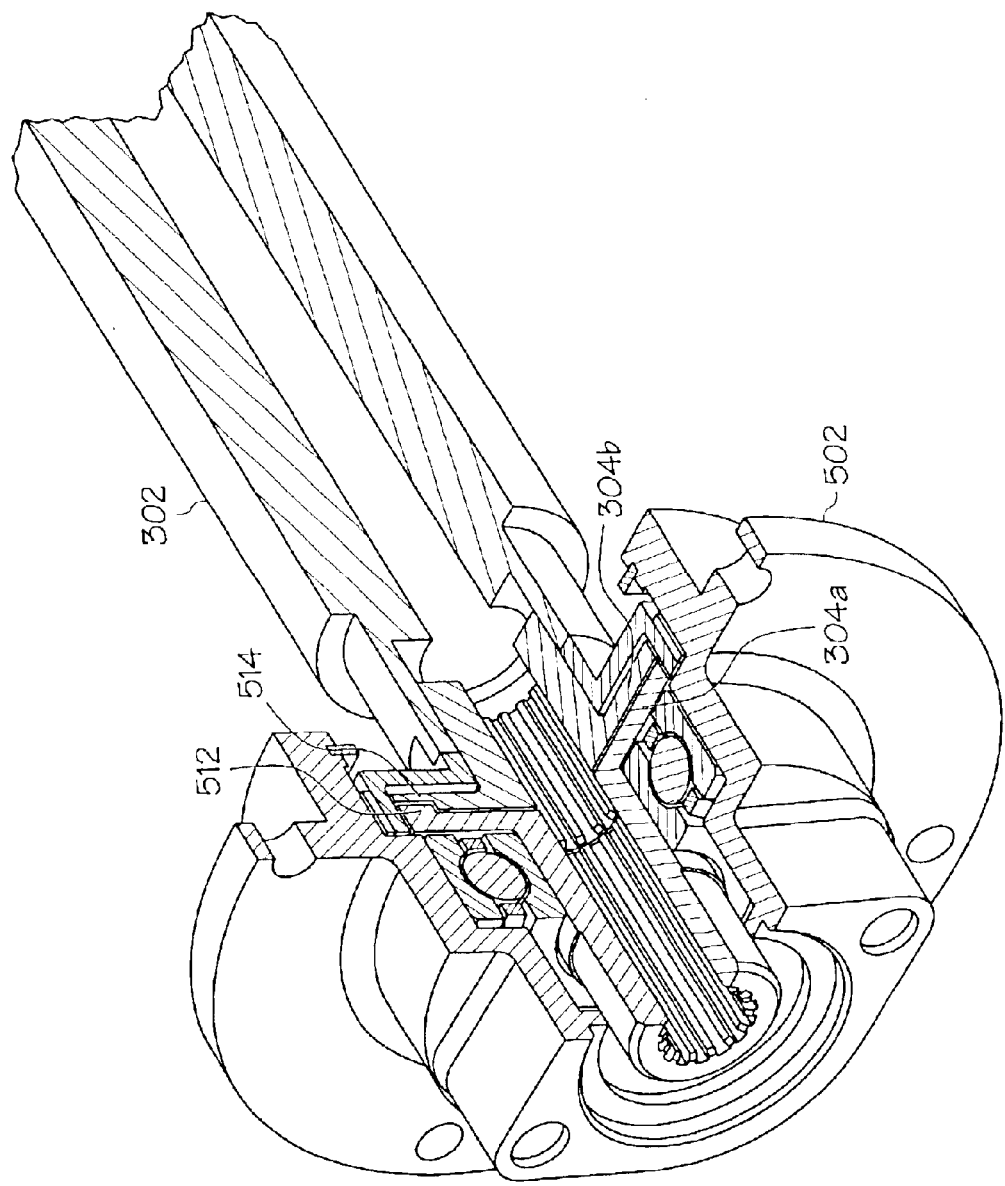
FIG. 6 is a partial cross section view of the exemplary torque decoupler of FIG. 5.

With reference now to FIGS. 4–6, a detailed description of a particular embodiment of the PDU assembly 220 will be provided. Referring first to FIG. 4, the depicted PDU assembly 220 includes a housing 402, which may be constructed of one or more pieces. The motor 214 and output shaft 302 are mounted within the housing 402. The output shaft 302 is rotationally mounted within the housing 402 by first 404a and second 404b bearing assemblies. The torque decoupler assembly 216, which houses the first 304a and second 304b output sections, is coupled to one end of the housing 402, and a lock assembly 406 is coupled to another end of the housing 402. A particular preferred embodiment of the torque decoupler assembly 216 is described in more detail below. The lock assembly 406 may include either, or both, a remotely operated lock and a manual lock, and is preferably any one of numerous known lock assemblies. A detailed understanding of the lock assembly 406 is not needed and, as such, it will not be further described.

The torque decoupler assembly 216 and its connection to the motor 214 are shown more clearly in FIGS. 5 and 6. As can be seen, the first 304a and second 304b output sections are mounted in a housing 501, and each include a substantially cylindrical plate 502 and a substantially cylindrical hub 504. Each of the cylindrical plates 502 includes a peripheral surface 506 and an engagement surface 508. Two or more shear pin receptacles 510 are formed on the peripheral surface 506 of each plate 502. The purpose of these receptacles 510 is described more fully below. In the depicted embodiment, the engagement surface 508 on each of the output sections 304a, 304b includes at least one engagement mechanism 512 and at least one contact mechanism 514. It will be appreciated that each engagement surface 508 need not include both the engagement mechanism 512 and the contact mechanism 514. For example, one of the output sections 304a (or 304b) could include one or more of the engagement mechanisms 512 and no contact mechanisms 514, while the other output section 304b (or 304a) includes one or more of the contact mechanisms 514 and no engagement mechanisms 512. Preferably, however, each engagement mechanism 512 on one engagement surface 508 is collocated with each contact mechanism 514 on the other engagement surface 508.

In the depicted embodiment, the engagement mechanisms 512 are configured as protrusions that extend substantially perpendicular away from the engagement surface 508, and the contact mechanisms 514 are configured as depressions that extend substantially perpendicular into the engagement surface 508. As will be described more fully below, the engagement mechanisms 512 and the contact mechanisms 514 are not engaged with one another during normal PDU assembly operations, but engage one another only after the above-described torque magnitude is reached in either the first 304a or second 304b output sections, and after the deadband time period.

Each of the hubs 504 includes an opening 516 that has a splined inner surface that is configured to engage one of the drive mechanisms 212. The hub 504 of the first output section 304a is rotationally mounted with a bearing assembly 505 With reference back to FIG. 4, it is seen that the first output section 304a may be directly coupled to one of the drive mechanisms 212, whereas the second output section 304b may be coupled to one of the drive mechanisms 212 via a quill shaft 408 and an extension 410. The quill shaft 408 is coupled at one end to the hub 504 of the second output section 304b, extends through the motor output shaft 302, which is hollow, and is coupled at its other end to one end of the extension 410. The extension 410 extends through the lock assembly 406, and its other end includes a splined inner surface that is configured to couple to one of the drive mechanisms 212. It will be appreciated that using a quill shaft is merely exemplary of a particular preferred embodiment, and that other mechanisms for splitting the output torque from the motor 214 may be used including, but not limited to, a 90-degree gearbox, and a differential gear.

Returning now to FIGS. 5 and 6, the motor output shaft 302 is coupled to the decoupler assembly 216 via a drive ring 518. The drive ring 518 includes a shaft mating section 520 and a decoupler mating section 522. In the depicted embodiment, the shaft mating section 520 includes at least two slots 524, and is configured to slide over a portion of the motor output shaft 302. Each of the slots 524 mates with a protrusion 526 that is formed on the same portion of the output shaft 302 that the shaft mating section 520 slides over. Thus, when the motor output shaft 302 rotates, it causes the drive ring 518 to rotate. The decoupler mating section 522 includes a plurality of orifices 528, and is configured to slide over the decoupler assembly 216. The orifices 528 are collocated with at least one of the shear pin receptacles 510 on each of the first 304a and second 304b output sections. A shear pin 530 extends through selected ones, or all, of the orifices 528 and into the collocated shear pin receptacle 510, and is held in place via a pin containment ring 532. Thus, when the motor output shaft 302 rotates the drive ring 518, the decoupler assembly 216 also rotates. The shear pins 530 are designed to shear, thereby disengaging the drive ring 518 from the associated output section 304a or 304b, upon a particular torque magnitude being reached in the associated output section 304a or 304b.

During normal operations of the PDU assembly 220, the engagement mechanisms 512 and contact mechanisms 514 do not contact one another, and the decoupler assembly output sections 304a and 304b are rotated in unison with one another. If, however, the load on the PDU assembly 220 causes the torque in, for example, the first output section 304a to reach or exceed a first magnitude, then each shear pin 530 that couples the first output section 304a and the drive ring 518 together will shear. This will cause the first output section 304a to decouple from the drive ring 518 and the motor output shaft 302, and will cease rotating in unison with the second output section 304b. As a result, after some deadband time period, one or more of the engagement mechanisms 512 and one or more of the contact mechanisms 514 on the first 304a and second 304b output sections will come into contact with one another, coupling the first 304a and second 304b output sections together. With the first 304a and second 304b output sections coupled together, the torque in the second output section 304b will then reach or exceed a torque magnitude, shearing each shear pin 530 that couples the second output section 304b to the drive ring 518. This will cause the second output section 304b to decouple from the drive ring 518 and motor output shaft 302. At this time, the PDU assembly 220 is completely unloaded. It will be appreciated that the time it takes for the engagement mechanisms 512 and the contact mechanisms 514 to contact one another following a shear of the shear pins 510 (e.g., the deadband time period) may be adjusted by, for example, adjusting the amount of angular displacement between the contact surfaces of the engagement mechanisms 512 and the contact mechanisms 514.

The above-described PDU assembly 220 sequentially decouples two or more loads, such as in a thrust reverser system, that are coupled to a single output shaft in the event a torque magnitude is reached between the power drive unit and one of the loads. Thus, for example, the drive mechanisms can be sized to withstand only half of the PDU assembly output torque, and will be decoupled from the motor in the event of a jam. As a result, the cost and/or the weight of the thrust reverser system and/or the system components can be reduced relative to other designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A thrust reverser control system, comprising:
   a motor having an output shaft and operable to supply a drive force;
   at least two drive mechanisms each coupled to receive the drive force;
   at least two actuator assemblies, each actuator assembly coupled to at least one of the drive mechanisms and operable to move, upon receipt of the drive force, between a stowed position and a deployed position; and
   a torque decoupler assembly coupled between the motor output shaft and two of the drive mechanisms, whereby the drive force is transmitted from the motor to the drive mechanisms, the torque decoupler assembly including a first output section and a second output section, wherein:
   the first output section is coupled to the motor output shaft and is operable to (i) decouple the motor from one of the drive mechanisms upon a first torque magnitude being reached in the first output section and (ii) engage the second output section a time period after the first torque magnitude is reached, and
   the second output section is coupled to the motor output shaft and is operable to (i) decouple the motor from the other drive mechanism upon a second torque magnitude being reached in the second output section and (ii) engage the first output section a time period after the second torque magnitude is reached.

2. The system of claim 1, further comprising:
   an engagement mechanism on one of the first or second output sections; and
   a contact mechanism on the other of the first or second output sections,
   wherein the contact mechanism contacts the engagement mechanism a time period after either the first or second torque magnitudes is reached.

3. The system of claim 1, wherein the first and second output sections each comprise:
   a plate including at least a peripheral surface and an engagement surface;
   one or more shear pin receptacles in the peripheral surface; and
   an engagement mechanism and a contact mechanism each formed on the engagement surface.

4. The system of claim 3, further comprising:
   a drive ring coupled to the motor output shaft and having at least two shear pin receptacles formed in a surface thereof, at least one of the drive ring shear pin receptacles substantially aligned with at least one of the shear pin receptacles in the plate peripheral surface of each of the first and second output sections; and
   two or more shear pins, each inserted into one of the drive ring shear pin receptacles and one of the shear pin receptacles in one of the first and second plates.

5. The system of claim 2, wherein the engagement mechanism and the contact mechanism are spaced apart from one another and the spacing thereof sets the time period.

6. The system of claim 1, further comprising:
a quill shaft coupled to the second output section and extending through the motor output shaft, the quill shaft adapted to couple to one of the drive mechanisms.

7. The system of claim 1, wherein the first and second output sections are selectively coupled together upon the first or second torque magnitudes being reached in either the first or second output sections.

8. The system of claim 1, wherein the first and second torque magnitudes are substantially equivalent.

9. A power drive unit, comprising:
a motor having an output shaft and operable to supply a drive force to at least a first load and a second load;
a first output section coupled to the motor output shaft; and
a second output section coupled to the motor output shaft,
wherein:
the first output section is operable to (i) decouple the motor from the first load upon a first torque magnitude being reached in the first output section and (ii) engage the second output section a time period after the first torque magnitude is reached, and
the second output section is operable to (i) decouple the motor from the second load upon a second torque magnitude being reached in the second output section and (ii) engage the first output section a time period after the second torque magnitude is reached.

10. The power drive unit of claim 9, further comprising:
an engagement mechanism on one of the first or second output sections; and
a contact mechanism on the other of the first or second output sections,
wherein the contact mechanism contacts the engagement mechanism a time period after either the first or second torque magnitudes is reached.

11. The power drive unit of claim 9, wherein the first and second output sections each comprise:
a plate including at least a peripheral surface and an engagement surface;
one or more shear pin receptacles in the peripheral surface; and
an engagement mechanism and a contact mechanism each formed on the engagement surface.

12. The power drive unit of claim 11, further comprising:
a drive ring coupled to the motor output shaft and having at least two shear pin receptacles formed in a surface thereof, at least one of the drive ring shear pin receptacles substantially aligned with at least one of the shear pin receptacles in the plate peripheral surface of each of the first and second output sections; and
two or more shear pins, each inserted into one of the drive ring shear pin receptacles and one of the shear pin receptacles in one of the first and second plates.

13. The power drive unit of claim 10, wherein the engagement mechanism and the contact mechanism are spaced apart from one another and the spacing thereof sets the time period.

14. The power drive unit of claim 9, further comprising:
a quill shaft coupled to the second output section and extending through the motor output shaft, the quill shaft adapted to couple to at least one drive mechanism.

15. The power drive unit of claim 9, wherein the first and second output sections are selectively coupled together upon the first or second torque magnitudes being reached in either the first or second output sections.

16. The power drive unit of claim 9, wherein the first and second torque magnitudes are substantially equivalent.

17. A torque decoupler assembly operable to decouple at least a first and a second load from a single motor output shaft, comprising:
a first output section; and
a second output section,
wherein:
the first output section is adapted to couple to the motor output shaft and operable to (i) decouple the motor output shaft from the first load upon a first torque magnitude being reached in the first output section and (ii) engage a second output section a time period after the first torque magnitude is reached; and
the second output section is adapted to couple to the motor output shaft and operable to (i) decouple the motor output shaft from the second load upon a second torque magnitude being reached in the second output section and (ii) engage the first output section a time period after the second torque magnitude is reached.

18. The torque decoupler of claim 17, further comprising:
an engagement mechanism on one of the first or second output sections; and
a contact mechanism on the other of the first or second output sections,
wherein the contact mechanism contacts the engagement mechanism a time period after either the first or second torque magnitudes is reached.

19. The torque decoupler of claim 17, wherein the first and second output sections each comprise:
a plate including at least a peripheral surface and an engagement surface;
one or more shear pin receptacles in the peripheral surface; and
an engagement mechanism and a contact mechanism each formed on the engagement surface.

20. The torque decoupler of claim 19, further comprising:
a drive ring adapted to couple to the motor output shaft and having at least two shear pin receptacles formed in a surface thereof, at least one of the drive ring shear pin receptacles substantially aligned with at least one of the shear pin receptacles in the plate peripheral surface of each of the first and second output sections; and
two or more shear pins, each inserted into one of the drive ring shear pin receptacles and one of the shear pin receptacles in one of the first and second plates.

21. The torque decoupler of claim 18, wherein the engagement mechanism and the contact mechanism are spaced apart from one another and the spacing thereof sets the time period.

22. The torque decoupler of claim 17, farther comprising:
a quill shaft coupled to the second output section and extending through the motor output shaft, the quill shaft adapted to couple to at least one drive mechanism.

23. The torque decoupler of claim 17, wherein the first and second output sections are selectively coupled together upon the first or second torque magnitudes being reached in either the first or second output sections.

24. The torque decoupler of claim 17, wherein the first and second torque magnitudes are substantially equivalent.

25. A torque decoupler assembly operable to decouple at least a first and a second load from a single motor output shaft, comprising:

a first output section adapted to couple to the motor output shaft and operable to (i) decouple the motor from the first load upon a first torque magnitude being reached in the first output section and (ii) engage a second output section a time period after the first torque magnitude is reached; and a second output section adapted to couple to the motor output shaft and operable to (i) decouple the motor from the second load upon a second torque magnitude being reached in the second output section and (ii) engage the first output section a time period after the second torque magnitude is reached, wherein the first and second output sections each comprise:
- a plate including at least a peripheral surface and an engagement surface,
- one or more shear pin receptacles in the peripheral surface, and
- an engagement mechanism and a contact mechanism each formed on the engagement surface and spaced apart from one another, the spacing thereof setting the time period, wherein the contact mechanisms contact the engagement mechanisms the time period after either the first or second torque magnitudes is reached;

a drive ring adapted to couple to the motor output shaft and having at least two shear pin receptacles formed in a surface thereof, at least one of the drive ring shear pin receptacles substantially aligned with at least one of the shear pin receptacles in the plate peripheral surface of each of the first and second output sections;

two or more shear pins, each inserted into one of the drive ring shear pin receptacles and one of the shear pin receptacles in one of the first and second plates; and a quill shaft coupled to the second output section and extending through the motor output shaft, the quill shaft adapted to couple to at least one drive mechanism.

* * * * *